United States Patent Office 2,737,968
Patented Mar. 13, 1956

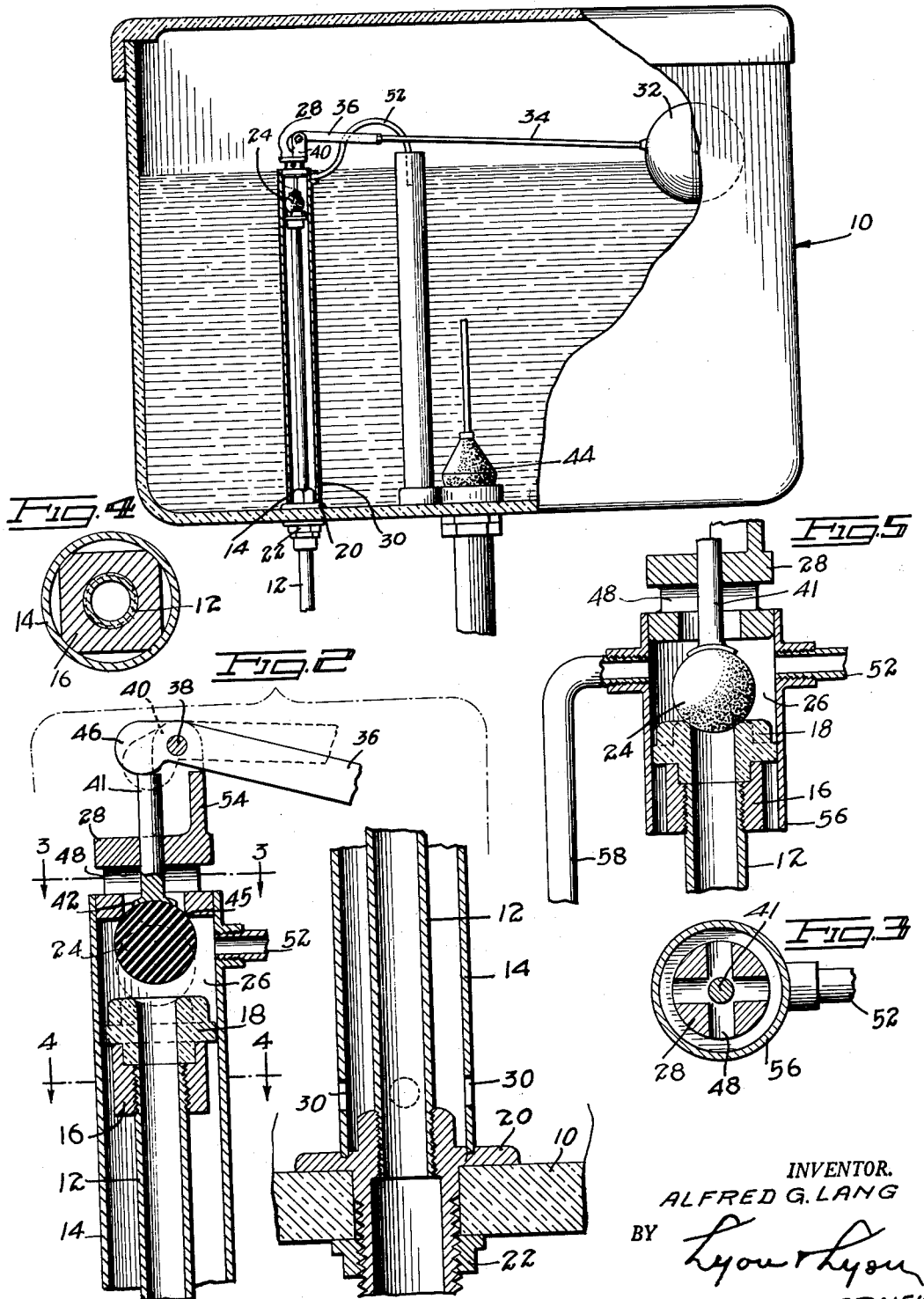

2,737,968
BALL COCK

Alfred G. Lang, Manhattan Beach, Calif.

Application April 6, 1953, Serial No. 346,990

2 Claims. (Cl. 137—218)

This invention relates to an improved ball cock.

It is an object of this invention to provide a ball cock of durable construction for controlling flow of potable water to a flush tank.

It is a further object of this invention to provide a ball cock wherein excess parts are eliminated and the structure simplified so that repairs and replacements are unnecessary.

It is still a further object of this invention to provide a ball cock having valve means therein insuring a positive termination of water flow and subject to little or no deterioration or corrosive action.

Other objects and advantages will be readily apparent from the following description:

In the drawings:

Figure 1 is a side elevation partially in section of a flush tank having a ball cock embodying this invention.

Figure 2 is a broken longitudinal section of the ball cock.

Figure 3 is a section taken along line 3—3 of Figure 2.

Figure 4 is a section taken along line 4—4 of Figure 2.

Figure 5 is a fragmentary sectional view of a modified form of this invention.

A flush tank 10 has a water supply pipe 12 projecting above the bottom thereof and surrounded by a tube 14 at its upper extremity. The pipe 12 has screwed thereon a nut 16 which forms a seat for the porcelain valve seat 18.

At its lower extremity the water supply pipe 12 screws into a ball cock tail piece 20 which projects through a suitable aperture in the bottom of the flush tank and is secured thereto by a nut 22. The extremity of the tail piece projecting from the tank is connected to a suitable supply of potable water.

The porcelain valve seat has a highly polished surface and forms a seat for the ball 24. The ball 24 is formed of rubber and is positioned in chamber 26 which is formed in the tube 14 between the porceltain valve seat 19 and the plug 28. When water is flowing through the inlet pipe 12 the pressure lifts ball 24 off the valve seat and water spills around the valve seat and out through apertures 30 into the flush tank.

The ball is positioned by the conventional float 32, which is attached by rod 34 to lever 36, which is pivotally mounted to the top of the plug 28 by means of pin 38 passing through a pair of arms such as 40 and the lever 36 which passes between the arms. The plug 28 has projecting therethrough a pin 41 which has a cupped extremity 42 conforming to the contour of ball 24. When the valve 44 is opened permitting water to flow from the tank the float 32 drops permitting water pressure in inlet pipe 12 to force the ball and pin 41 upwardly.

The ball 24 seats in a recess 45 in plug 28 and water flows into the flush tank 10. When the valve 44 is again seated the water level in the tank rises. At a predetermined level of the float the cam end 46 thereof engages pin 41 and unseats ball 24 from the plug 28, urging it onto valve seat 18, shutting off the flow of water.

The plug 28 is positioned with its lower extremity within the upper extremity of tube 14. In that portion of the plug projecting out of the tube 14 a number of ports 48 are provided which communicate with the recess 45. When the ball 24 is in the upper position seated in recess 45 the ports 48 are closed. However, when ball 24 is urged downwardly the ports 48 vent the chamber 26, eliminating any back siphon developing.

The refill tube 52 communicates with chamber 26 and water is directed through this tube when flowing in the usual manner. A stop 54 is carried by plug 28 which lies in the path of lever 36. It is desired to arrange the stop so that the float 32 falls only a short distance upon valve 44 being opened. It is preferred that this drop be limited to the amount necessary to permit the ball 24 to raise from valve seat 18 into recess 45, substantially one-eighth of an inch in the drawings. This restriction of the movement of the float results in very brief and positive unseating of the ball 24 from recess 45 and seating of the ball on valve seat 18.

In Figure 5 a modified form is illustrated wherein like parts are given the same numerical designation. In this embodiment the tube 14 is eliminated and replaced by a cylinder 56 which screws onto the upper extremity of supply pipe 12. A tube 58 directs water from chamber 26 inside cylinder 56 to the lower part of the flush tank 10.

While what hereinbefore has been described is the preferred embodiment of this invention it is readily apparent that alterations and modifications can be resorted to without departing from the scope of this invention and such alterations and modifications are intended to be included within the scope of the following claims.

I claim:

1. A ball cock comprising: a water supply pipe, a tube surrounding said supply pipe and extending above the extremity thereof, a valve seat on the extremity of said supply pipe, ball valve means in said tube above said valve seat, cap means at the extremity of said tube, pin means having a cup shaped extremity thereon and projecting through said cap means, means forcing said pin downwardly to urge said ball into seating relationship with said valve seat, said cap means being recessed in its lower surface to provide a seat for said ball valve means, and port means communicating said recess valve seat in said cap with the atmosphere preventing a back siphon developing in said valve chamber, said tube having ports at the extremity opposing said cap whereby water flowing out of said inlet pipe passes around said valve seat and out said ports.

2. A ball cock comprising: a water supply pipe, a tube surrounding said supply pipe and extending above the extremity thereof, a highly polished porcelain valve seat on the extremity of said supply pipe, a rubber ball in said tube above said valve seat, and means for urging said rubber ball into engagement with said porcelain valve seat against pressure of water flowing through said supply pipe, cap means at the extremity of said tube, said cap means being recessed in its lower surface to provide a seat for said ball valve means, and port means communicating the recess valve seat in said cap with the atmosphere preventing a back siphon developing in said valve chamber, said tube having ports at the extremity opposing said cap whereby water flowing out of said inlet pipe passes around said valve seat and out said apertures.

References Cited in the file of this patent

UNITED STATES PATENTS

| | | |
|---|---|---|
| 602,512 | Lecher | Apr. 19, 1898 |
| 740,972 | Booth | Oct. 6, 1903 |
| 1,354,311 | Landrum | Sept. 28, 1920 |
| 2,117,389 | Yoder | May 17, 1938 |
| 2,284,051 | Gilbert | May 26, 1942 |
| 2,294,785 | Langdon | Sept. 1, 1942 |
| 2,329,337 | Criss | Sept. 14, 1943 |
| 2,382,500 | Owens | Aug. 14, 1945 |
| 2,409,890 | Owens | Oct. 22, 1946 |

FOREIGN PATENTS

| | | |
|---|---|---|
| 140 | Great Britain | Jan. 13, 1876 |
| 211,511 | Germany | July 3, 1909 |